United States Patent
Bragin et al.

(10) Patent No.: US 11,183,808 B2
(45) Date of Patent: Nov. 23, 2021

(54) EXCIMER LASER WITH UNIFORM BEAM

(71) Applicant: Coherent LaserSystems GMBH & Co. KG, Göttingen (DE)

(72) Inventors: Igor Bragin, Göttingen (DE); Timur Misyuryaev, Göttingen (DE); Paul Van Der Wilt, Göttingen (DE)

(73) Assignee: Coherent LaserSystems GMBH & Co. KG, Göttingen (DE)

( * ) Notice: Subject to any disclaimer, the term of this patent is extended or adjusted under 35 U.S.C. 154(b) by 0 days.

(21) Appl. No.: 16/796,587

(22) Filed: Feb. 20, 2020

(65) Prior Publication Data
US 2020/0303889 A1     Sep. 24, 2020

Related U.S. Application Data

(60) Provisional application No. 62/821,239, filed on Mar. 20, 2019.

(51) Int. Cl.
| | |
|---|---|
| *H01S 3/082* | (2006.01) |
| *H01S 3/034* | (2006.01) |
| *H01S 3/08* | (2006.01) |
| *H01S 3/225* | (2006.01) |

(52) U.S. Cl.
CPC .............. *H01S 3/034* (2013.01); *H01S 3/082* (2013.01); *H01S 3/0804* (2013.01); *H01S 3/08081* (2013.01); *H01S 3/225* (2013.01); *H01S 2301/20* (2013.01)

(58) Field of Classification Search
CPC ........ H01S 3/082–3/0826; H01S 3/225–2258; H01S 3/0804; H01S 3/0816; H01S 2301/20; H01S 2301/206; H01S 3/2366; H01S 3/2383
See application file for complete search history.

(56) References Cited

U.S. PATENT DOCUMENTS

| | | | | |
|---|---|---|---|---|
| 3,611,436 A * | 10/1971 | Rigrod | ................... | H01S 3/1075 372/20 |
| 3,800,906 A * | 4/1974 | Albares | ................... | G02F 2/002 73/648 |
| 3,808,557 A * | 4/1974 | Smiley | ..................... | G01H 9/00 359/287 |
| 3,969,684 A * | 7/1976 | Witte | ...................... | H01S 3/022 372/25 |

(Continued)

FOREIGN PATENT DOCUMENTS

| | | |
|---|---|---|
| JP | 1-96975 A | 4/1989 |
| JP | 1-231385 A | 9/1989 |

OTHER PUBLICATIONS

International Search Report and Written Opinion received for PCT Patent Application No. PCT/EP2020/057287, dated Jun. 25, 2020, 12 pages.

*Primary Examiner* — Tod T Van Roy
(74) *Attorney, Agent, or Firm* — Morrison & Foerster LLP

(57) ABSTRACT

Fine-structure in the transverse mode of an excimer laser beam is minimized by having a plurality of resonator mirrors located at each end of a linear excimer laser. At one end, a highly-reflective end mirror and a partially-reflective end mirror are inclined at small angle with respect to each other. At the other end, two output-coupling mirrors are inclined at a small angle with respect to each other. This arrangement of resonator mirrors generates a composite laser beam that blurs any fine structure.

15 Claims, 6 Drawing Sheets

(56) References Cited

U.S. PATENT DOCUMENTS

| | | | | |
|---|---|---|---|---|
| 4,502,144 | A * | 2/1985 | Suhre | H01S 3/105 |
| | | | | 372/102 |
| 4,920,541 | A * | 4/1990 | Baumgartner | H01S 3/08004 |
| | | | | 372/108 |
| 5,195,104 | A * | 3/1993 | Geiger | G02F 1/39 |
| | | | | 359/330 |
| 5,371,758 | A * | 12/1994 | Dougal | H01S 3/022 |
| | | | | 372/100 |
| 5,557,625 | A * | 9/1996 | Durville | H01S 3/082 |
| | | | | 372/10 |
| 5,675,596 | A * | 10/1997 | Kong | H01S 3/113 |
| | | | | 372/25 |
| 5,684,623 | A * | 11/1997 | King | H01S 3/082 |
| | | | | 359/346 |
| 5,901,163 | A | 5/1999 | Ershov | |
| 6,201,638 | B1 * | 3/2001 | Hall | G02F 1/395 |
| | | | | 359/346 |
| 6,292,505 | B1 | 9/2001 | Takenaka et al. | |
| 6,393,040 | B1 | 5/2002 | Govorkov et al. | |
| 6,850,544 | B2 * | 2/2005 | Friesem | H01S 3/08036 |
| | | | | 372/105 |
| 7,408,714 | B2 | 8/2008 | Windpassinger et al. | |
| 7,428,039 | B2 | 9/2008 | Ferber | |
| 7,615,722 | B2 | 11/2009 | Govorkov et al. | |
| 8,238,400 | B2 | 8/2012 | Targsdorf et al. | |
| 2002/0012368 | A1 * | 1/2002 | Kleinschmidt | H01S 3/1392 |
| | | | | 372/32 |
| 2013/0322483 | A1 * | 12/2013 | Nagai | G02B 1/02 |
| | | | | 372/61 |

* cited by examiner

EXCIMER LASER WITH UNIFORM BEAM

PRIORITY

This application claims priority to U.S. Provisional Application Ser. No. 62/821,239, filed Mar. 20, 2019, the disclosure of which is incorporated herein in its entirety.

TECHNICAL FIELD OF THE INVENTION

The present invention relates in general to gas-discharge lasers. The invention relates in particular to resonator mirror arrangements for excimer gas-discharge lasers.

DISCUSSION OF BACKGROUND ART

Excimer lasers generate high-power laser-radiation in the ultraviolet region of the electromagnetic spectrum. The gain-medium is a flowing pressurized gas mixture, which typically includes a noble gas, a halide gas, and buffer gases. The gas mixture is energized by a short current pulse between two elongated electrodes to create excited weakly-bonded dimers in a gas discharge. For example, a gas mixture can include xenon (Xe) and hydrogen chloride (HCl) gases, plus helium (He) or neon (Ne) as a neutral buffer gas. When energized, electronically-excited XeCl dimers are created having a laser line at 308 nm. Other examples are argon-fluoride (ArF) dimers having a laser line at 193 nm and xenon fluoride (XeF) dimers having a laser line at 351 nm.

Typically, the gas mixture may be energized at repetition rates of up to a few kilohertz, the gas discharge can be sustained for a duration of a few nanoseconds up to a few hundred nanoseconds, the output laser pulse has a duration of a few nanoseconds up to a few tens of nanoseconds, and the average output laser power can be up to many hundreds of watts. The most-powerful state-of-the art industrial excimer lasers are based on XeCl, generating pulse energies up to 1 joule at pulse repetition rates up to 600 hertz. For example, the Lambda SX excimer laser from Coherent Inc. of Santa Clara, Calif. Such an excimer laser can operate continuously for over 100 million pulses, while maintaining very-high pulse-energy stability and stable beam parameters. In applications requiring even greater pulse energy, the output of two or more excimer lasers can be combined by beam-mixing optics and synchronization of pulse delivery. Such beam-mixing and synchronization are described in U.S. Pat. Nos. 7,408,714 and 8,238,400, respectively, each assigned to the assignee of the present invention and the complete disclosure of each incorporated herein by reference.

One important application is laser recrystallization of silicon, which is a process used in the manufacture of flat panels for consumer electronic-device screens and large-format display screens. Silicon is a semiconductor base onto which electronic circuits in a screen are formed by lithographic processes. In the recrystallization process, a thin layer of amorphous silicon on a glass substrate is repeatedly melted by a pulsed beam of laser radiation until a desired crystalline micro-structure is obtained. The substrate and the silicon layer thereon are scanned relative to the source of laser radiation and optics that deliver the laser radiation. The beam of laser radiation incident on the silicon layer is shaped into an elongated "line beam", having a uniform intensity distribution along a direction orthogonal to the scanning direction. Excimer lasers are a favored source in this process, referred to as "excimer laser annealing". It is a delicate process. It is critical to maintain a stable and uniform intensity distribution having an optimum energy density.

Methods and apparatus for shaping excimer laser beams into line beams are described in U.S. Pat. Nos. 7,428,039 and 7,615,722, assigned to the assignee of the present invention and the complete disclosures of which are incorporated herein by reference. These methods incorporate beam homogenization, whereby the laser beam from one or more sources is spatially partitioned, with the partitioned beams projected onto and overlaid on the silicon layer. For example, between ten and thirty projected and overlaid line beams, each having dimensions of about 0.4 mm in a short axis and 750 mm to 1500 mm in a long axis. Beam homogenization requires expensive and complex optical arrangements, including lens arrays that will accommodate a large beam from an excimer laser. For example, a beam having transverse dimensions of 15 mm×35 mm.

Further averaging is achieved by exposing each location on the silicon layer to multiple laser pulses. For example, 10 to 20 consecutive laser pulses. Nevertheless, the performance of screens manufactured using this process could still be improved by reducing variances in the crystalline microstructure, by forming a more-stable and more-uniform line beam. One cause of instability and non-uniformity is fine structure in the transverse spatial mode of the excimer laser beam, caused by instabilities in the gas discharge, turbulence in the gas flow, and contamination of the gas-containment windows. This fine structure is unstable and changes significantly from pulse to pulse. Energy density at any location in the output beam of an excimer laser may have a standard deviation greater than 10%, or even greater than 20%, while the integrated energy of the whole beam has a standard deviation of less than 0.3%. Fine structure is more difficult to homogenize than coarse structure, particularly when it becomes smaller than an individual lens element in a lens array.

There is need for an excimer laser producing a laser beam having minimal fine structure. Specifically, producing a laser beam having minimal brightness contrast in the fine structure. Preferably, this reduction in brightness contrast would be achieved without compromising efficiency, pulse energy, average power, or any other critical beam parameter. Other applications of excimer lasers would also benefit from reducing brightness contrast in the fine structure, such as microlithography and laser lift-off.

SUMMARY OF THE INVENTION

In one aspect of the present invention, an excimer laser generating a laser beam comprises a laser chamber containing an energized gas mixture, a first rear mirror having a high reflectivity at a wavelength of the laser beam, and a second rear mirror that is partially reflective at the wavelength of the laser beam. The first and second rear mirrors are at one end of the laser chamber. The second rear mirror is located between the first rear mirror and the laser chamber. The first and second rear mirrors are tilted with respect to each other at a first angle. A first output-coupling mirror and a second output-coupling mirror are provided. The first and second output-coupling mirrors are located at an opposite end of the laser chamber. The first and second output-coupling mirrors are tilted with respect to each other at a second angle.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain principles of the present invention.

DETAILED DESCRIPTION OF THE INVENTION

Figure 1A:
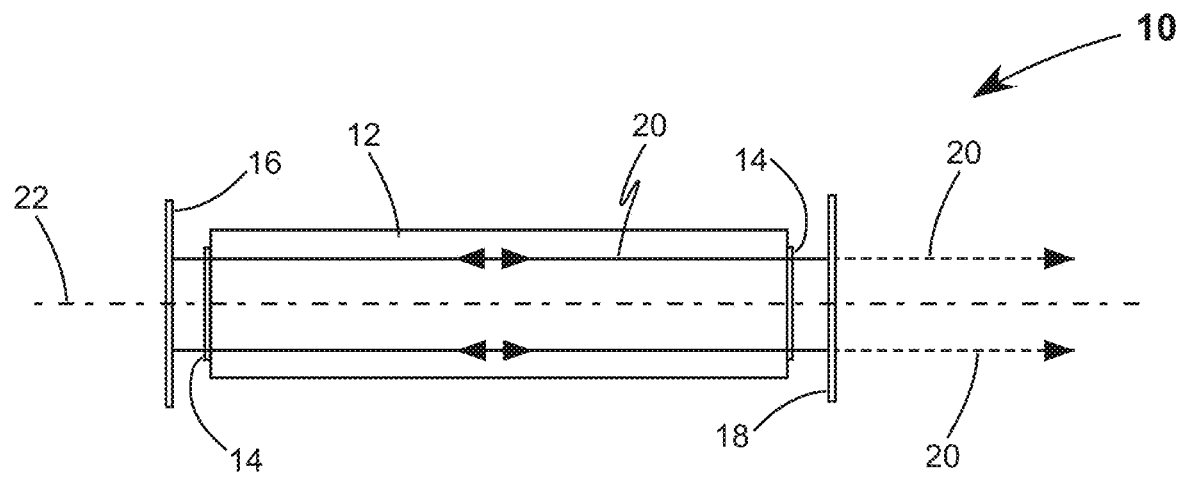
FIG. 1A is a side-view schematically illustrating a prior-art excimer laser that generates a pulsed laser beam, which includes a laser chamber, two windows, a high-reflecting mirror, and an output-coupling mirror.

Referring now to the drawings, wherein like components are designated by like numerals, FIG. 1A is a side-view schematically illustrating a prior-art excimer laser 10 that includes a laser chamber 12, two windows 14, a high-reflecting mirror 16, and an output-coupling mirror 18. Laser chamber 12 contains a gas mixture that is flowing and pressurized. The gas mixture is energized by short pulses of electrical current flowing between two elongated electrodes, thereby creating a pulsed gas discharge that includes excited dimer molecules. The elongated electrodes, power supplies injecting the pulsed electrical current, gas reservoirs, pumps for pressuring the gas mixture, and blowers for flowing the gas mixture are omitted from the drawing for clarity of illustration. High-reflecting mirror 16 and output-coupling mirror 18 form a linear laser resonator about the gas discharge, which generates a pulsed laser beam 20 that propagates along an optical axis 22.

Windows 14 have high transmission at the wavelength of laser beam 20. In the drawing, the windows are depicted with laser beam 20 at a normal angle-of-incidence. In this arrangement, the windows would be antireflection coated at the wavelength of the laser beam. In an alternative arrangement, uncoated windows would be oriented at Brewster's angle. High-reflecting mirror 16 has a reflectivity of about 100%. Output-coupling mirror 18 typically has a reflectivity of between 4% and 10%, most typically between 5% and 8%. Both mirrors usually have planar surfaces. Laser beam 20 is depicted by boundary rays, with solid lines indicating an intra-cavity laser beam and dashed lines indicating an output laser beam.

Figure 2A:
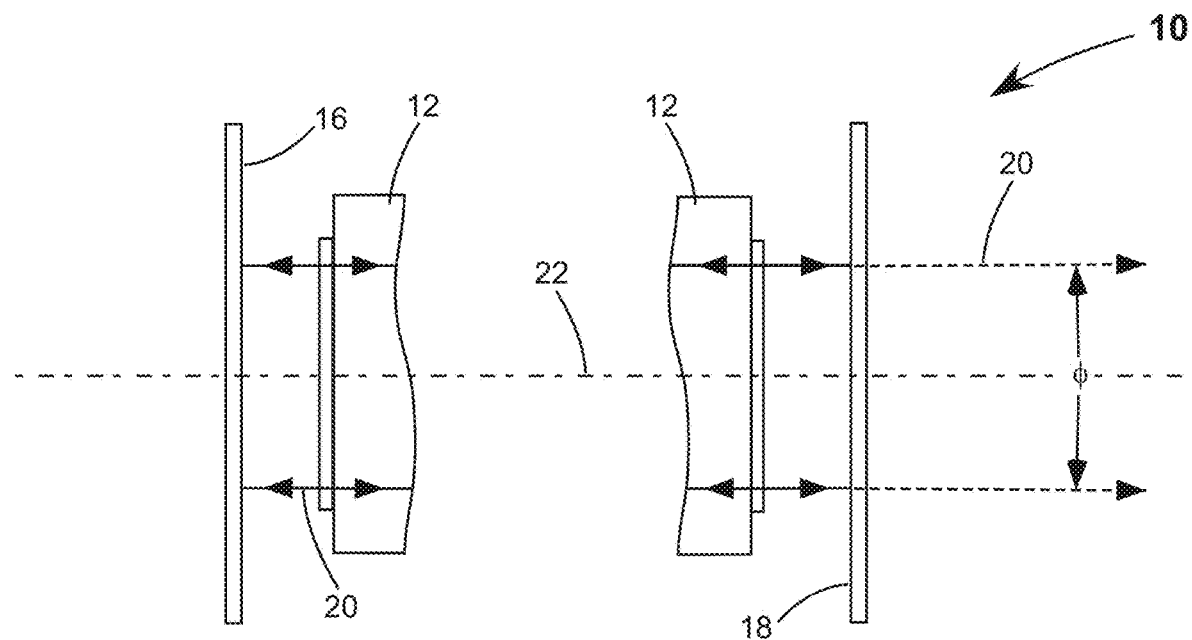
FIG. 2A is an enlarged side-view schematically illustrating further details of the prior-art excimer laser of FIG. 1A.

FIG. 2A is an enlarged-view schematically illustrating further details of excimer laser 10, at each end of the laser resonator. High-reflecting mirror 16 and output-coupling mirror 18 are both oriented at about normal angle-of-incidence with respect to laser beam 20. Relatively high output-coupler transmission is required, due to high gain in the gas discharge, so a high fraction of the intra-cavity beam incident on the output-coupling mirror becomes the output beam. The output beam has a full-angle beam divergence in the far-field $\phi$, which is typically within an order-of-magnitude of 1 milliradian (mrad) and is slightly larger in the long dimension than the short dimension. The beam divergence in the short dimension is more-typically in a range between 0.8 mrad and 1.5 mrad.

Figure 3A:
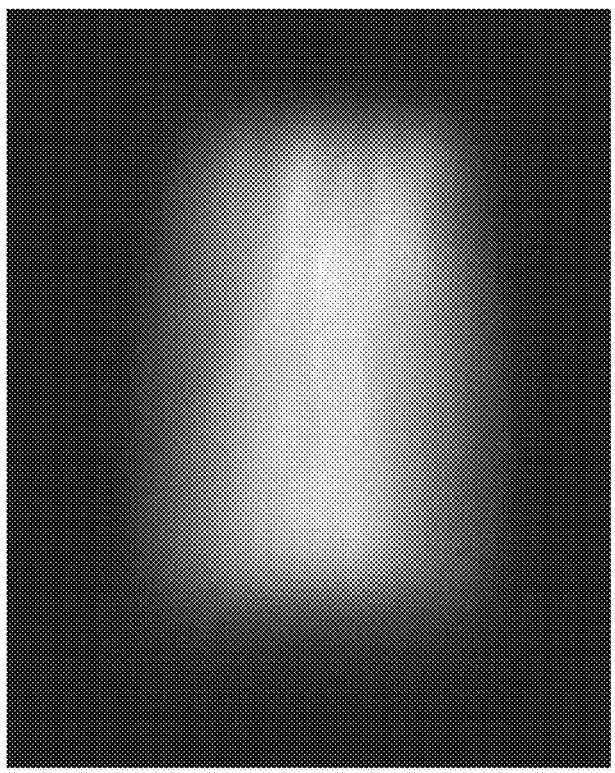
FIG. 3A is a near-field camera image of the transverse spatial mode of a pulsed laser beam from a prior-art excimer laser of the type illustrated in FIGS. 1A and 2A.

FIG. 3A is a near-field camera image of the transverse spatial mode of a laser beam from a prior-art excimer laser of the type illustrated in FIGS. 1A and 2A. The laser beam has dimensions of about 15 mm×35 mm, which are here horizontal×vertical. The long vertical dimension of the laser beam is determined by the physical separation between the electrodes. Current flow through the gas mixture is vertical. The short horizontal dimension of the laser beam is determined by the width and configuration of the electrodes.

The fine structure is dominated by vertical "streamers", some extending the full height of the beam, which are imprinted on the spatial mode as the beam is amplified in the gas discharge. Spatial modulations in the gain, which change from pulse-to-pulse, are due to instabilities in the gas discharge and turbulence in the gas flow, discussed above. Static components of the fine structure, invariant from pulse-to-pulse, are due to spatial modulations in losses caused by contamination of the windows and by damage to the windows induced by the intense ultraviolet laser radiation. Contamination and damage accumulates during operation of the laser, degrading performance, until the windows are replaced. Window replacement is a long-interval maintenance procedure.

Figure 1B:
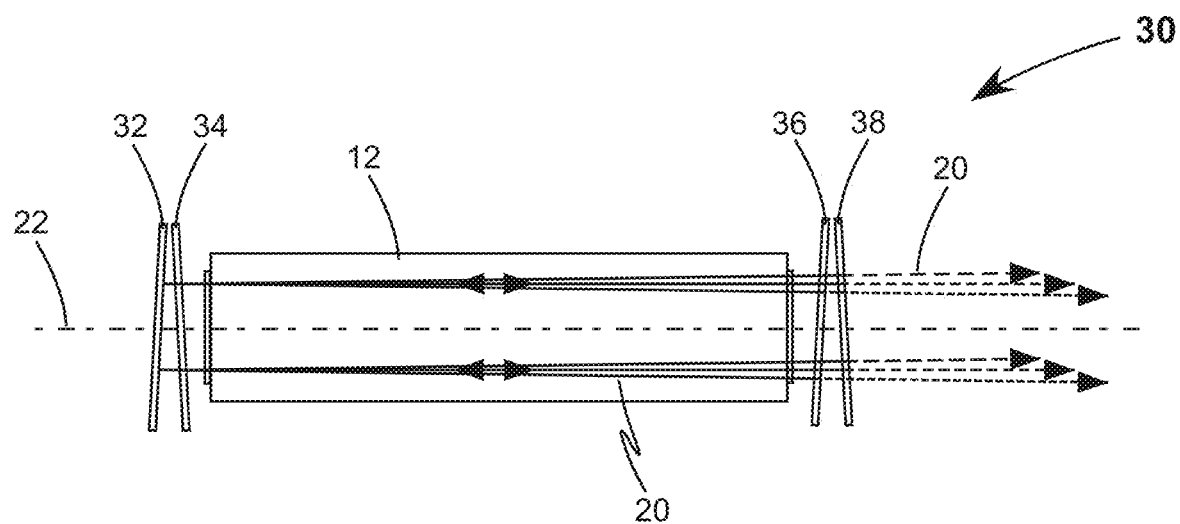
FIG. 1B is a side-view schematically illustrating one preferred embodiment of excimer laser in accordance with the present invention that generates a composite pulsed laser beam, which includes two rear mirrors and two output-coupling mirrors, the two rear mirrors tilted with respect to each other and the two output-coupling mirrors tilted with respect to each other.

FIG. 1B is a side-view schematically illustrating one preferred embodiment of excimer laser 30 in accordance with the present invention. Excimer laser 30 has two mirrors located at each end of the laser chamber. At one end, there is a first rear mirror 32 and a second rear mirror 34, with second rear mirror 34 located between first rear mirror 32 and laser chamber 12. First rear mirror 32, similar to high-reflecting mirror 16, has a high-reflectivity of about 100% at the wavelength of laser beam 20. Second rear mirror 34 is partially reflective, having a reflectivity in a range between 20% and 80%, most-preferably in a range between 35% and 65%. At an opposite end, there is a first output-coupling mirror 36 and a second output-coupling mirror 38. Similar to output-coupling mirror 18 in excimer laser 10, both first output-coupling mirror 36 and second output-coupling mirror 38 have relatively low reflectivity, so a high fraction of the intra-cavity beam incident on the two output-coupling mirrors becomes an output beam. For example, each mirror having a reflectivity of less than 5%.

Figure 2B:
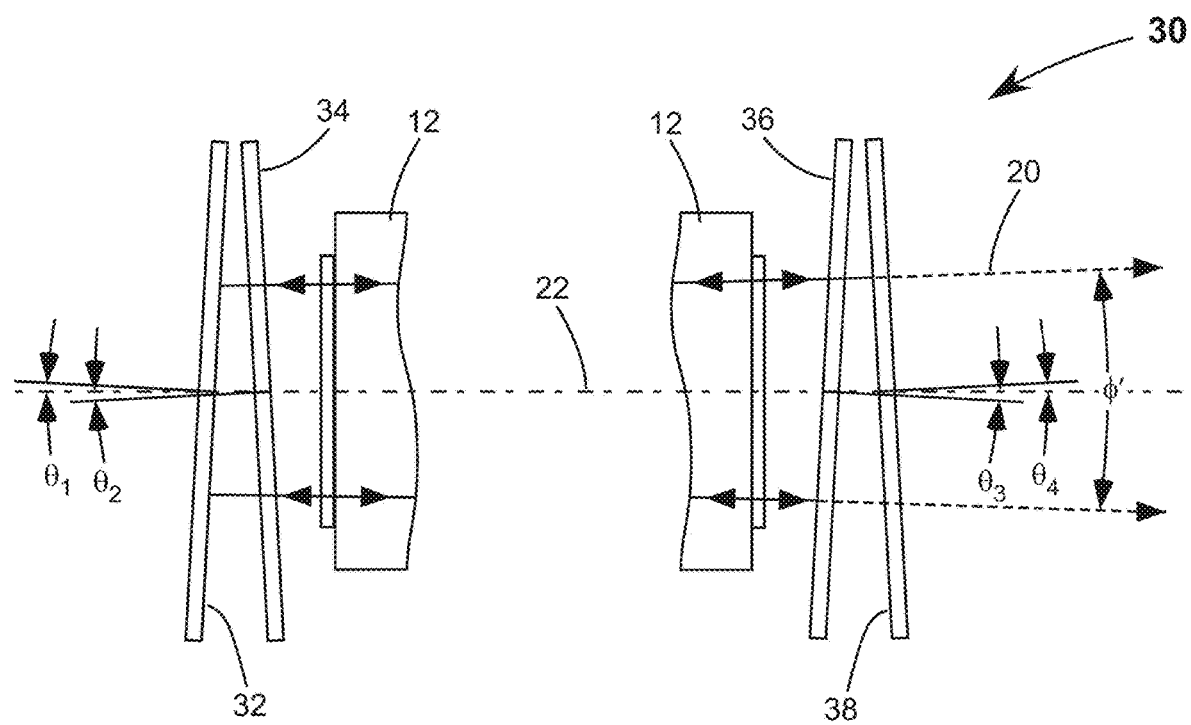
FIG. 2B is an enlarged side-view schematically illustrating further details of the excimer laser of FIG. 1B.

FIG. 2B is an enlarged-view schematically illustrating further details of excimer laser 30, at each end of the laser resonator. First rear mirror 32 and second rear mirror 34 are both tilted. The normal of first rear mirror 32 has an angle $\theta_1$ with respect to optical axis 22 and the normal of second rear mirror 34 has an angle $\theta_2$ with respect to optical axis 22. Both first output-coupling mirror 36 and second output-coupling mirror 38 are also tilted. The normal of first output-coupling mirror 36 has an angle $\theta_3$ with respect to optical axis 22 and the normal of second output-coupling mirror 38 has an angle $\theta_4$ with respect to optical axis 22.

Figure 2C:
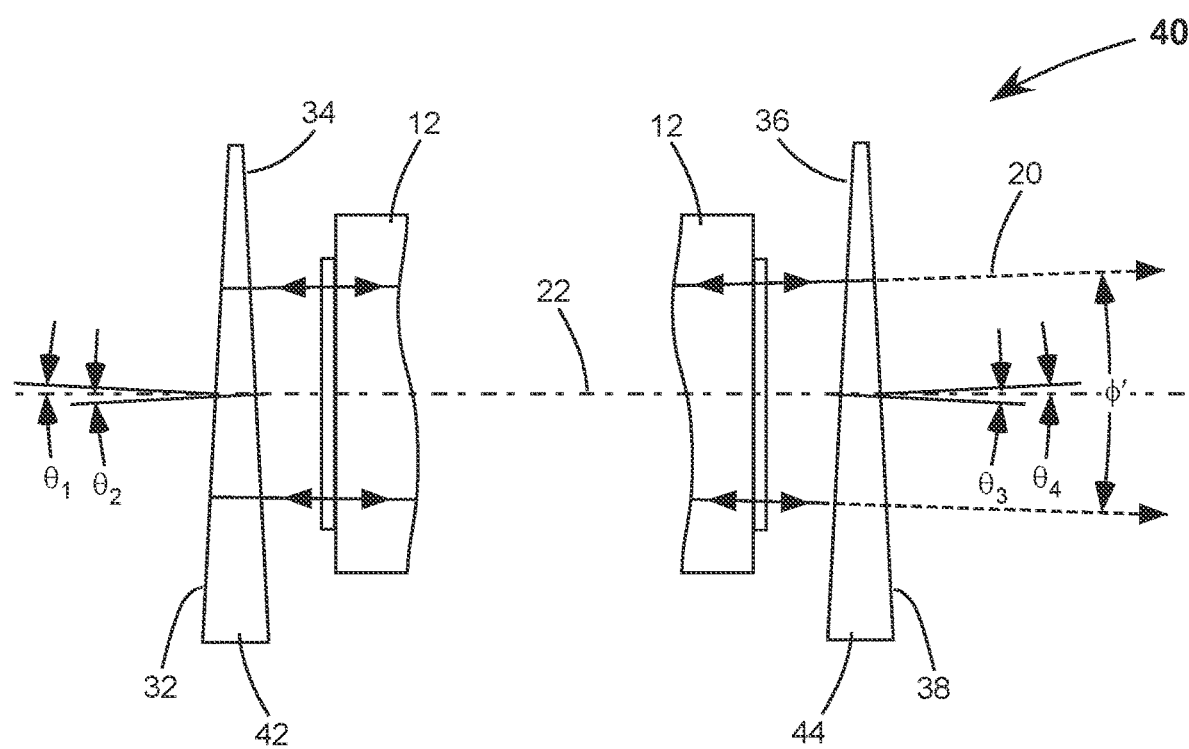
FIG. 2C is an enlarged side-view illustrating still another preferred embodiment of excimer laser in accordance with the present invention, similar to the excimer laser of FIGS. 1B and 2B, but the two rear mirrors are surfaces of one wedged-shaped substrate and the two output-coupling mirrors are surfaces of another wedged-shaped substrate.

As drawn, first rear mirror 32 is about parallel to first output-coupling mirror 36 ($\theta_1 \approx \theta_3$) and second rear mirror 34 is about parallel with second output-coupling mirror 38 ($\theta_2 \approx \theta_4$), although this is not a required condition for the inventive excimer laser to function. The first and second rear mirrors are depicted as discrete optical components, each optical component having parallel planar surfaces, with one of the surfaces being the mirror. An alternative and convenient arrangement of excimer laser 40 in accordance with the present invention is depicted in FIG. 2C, wherein the first and second rear mirrors are on opposite surfaces of one wedge-shaped optical component 42. Similarly, the first and second output-coupling mirrors are on opposite surfaces of another wedge-shaped optical component 44.

An effect of the mirror tilting is depicted in FIG. 1B. Laser beam 20 becomes essentially a composite beam, due to the intra-cavity beam being partitioned by the partially-reflective second rear mirror 34 and the weakly reflecting output-coupling mirrors 36 and 38. This partitioning produces a composite output beam, indicated by different dashed boundary rays in the drawing. The component output beams will not necessarily have the same power, although the principal components may have about the same power in some embodiments. Propagation angles of the component output beams with respect to each other have been exaggerated for purposes of illustration. In excimer laser 30, optical axis 22 can be defined as a line connecting the beam centroids at successive locations along the composite output beam, determined by the first-order moments of the transverse spatial mode thereof.

Returning to FIG. 2B, tilt angles $\theta_1$ through $\theta_4$ of mirrors 32 through 38 have also been exaggerated. The inventors found that a significant reduction of brightness contrast in fine structure could be obtained with tilt angles that are in a range between 5% and 20% of the full-angle divergence $\phi$ of an equivalent excimer laser having no resonator mirror tilting, such as excimer laser 10. By way of example, for an excimer laser having a full-angle beam divergence of 1 mrad with the resonator mirrors at normal incidence, tilting mirrors 32 through 38 from normal incidence by angles $\theta_1$ through $\theta_4$ of between 0.05 mrad and 0.2 mrad would cause significant blurring of the fine structure. For this exemplary excimer laser, to achieve a useful blurring of the fine structure, first rear mirror 32 would be tilted relative to second rear mirror 34 by at least 0.05 mrad and first output-coupling mirror 36 would be tilted relative to second output-coupling mirror 38 by at least 0.05 mrad.

In selecting the tilt angles, there is a compromise between enhancing mixing of the component beams to blur the fine structure and increasing the full-angle divergence of the composite output beam, which may be undesirable. Selecting small tilt angles relative to the full-angle divergence $\phi$, means the orientation of each tilt about optical axis 22 is not too critical. Some orientations were found to be better for blurring fine structure; most likely because the fine structure is otherwise dominated by the vertical streamers apparent in FIG. 3A. Similarly, the relative tilt angles $\theta_1+\theta_2$ and $\theta_3+\theta_4$ are more critical for blurring the fine structure than the individual tilt angles $\theta_1$ through $\theta_4$. However, tilting symmetrically about the optical axis by selecting $\theta_1 \approx \theta_2$ and $\theta_3 \approx \theta_4$ helps to minimize the overall full-angle divergence $\phi'$.

Figure 3B:
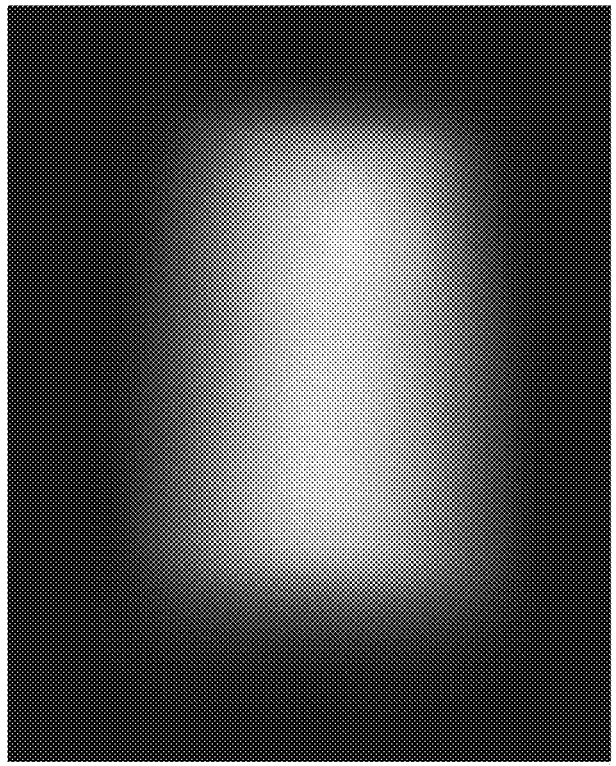
FIG. 3B is a near-field camera image of the transverse spatial mode of a composite pulsed laser beam from an excimer laser of the type illustrated in FIGS. 1B and 2B.

FIG. 3B is a near-field camera image of the transverse spatial mode of a laser beam from an inventive excimer laser of the type illustrated in FIGS. 1B and 2B. Rear mirrors 32 and 34 were coatings deposited on opposite sides of a transparent wedged-shaped substrate. Output-coupling mirrors 36 and 38 were also coatings deposited on opposite sides of an identical substrate. The thickness of the wedged substrate was about 5 mm. The wedge angle was about 0.12 mrad. The two wedges were oriented at about 90° with respect to each other and at about 45° with respect to the horizontal and vertical axes. These orientations were determined empirically to optimize the overall laser performance, including pulse energy, pulse energy stability, beam divergence, and beam symmetry. The thin edges of each wedge are closest to the bottom corners as viewed in FIG. 3B. The reflectivities were about 50% for second rear mirror 34 and about 2.75% for each of output-coupling mirrors 36 and 38.

The composite output beam of FIG. 3B has a divergence angle of about 1.3 mrad, compared to a divergence angle $\phi$ of about 1.0 mrad for the beam of FIG. 3A, which was generated by an equivalent prior-art excimer laser. Fine structure in the composite output beam of FIG. 3B is substantially blurred compared to fine structure the beam of FIG. 3A. The vertical streamers apparent in FIG. 3A are barely visible in FIG. 3B. The inventive excimer laser of FIG. 3B had about 99% of the efficiency of the prior-art excimer laser of FIG. 3A. This rather small 1% reduction in efficiency is comparable to efficiency changes caused by window replacement.

Figure 4A:
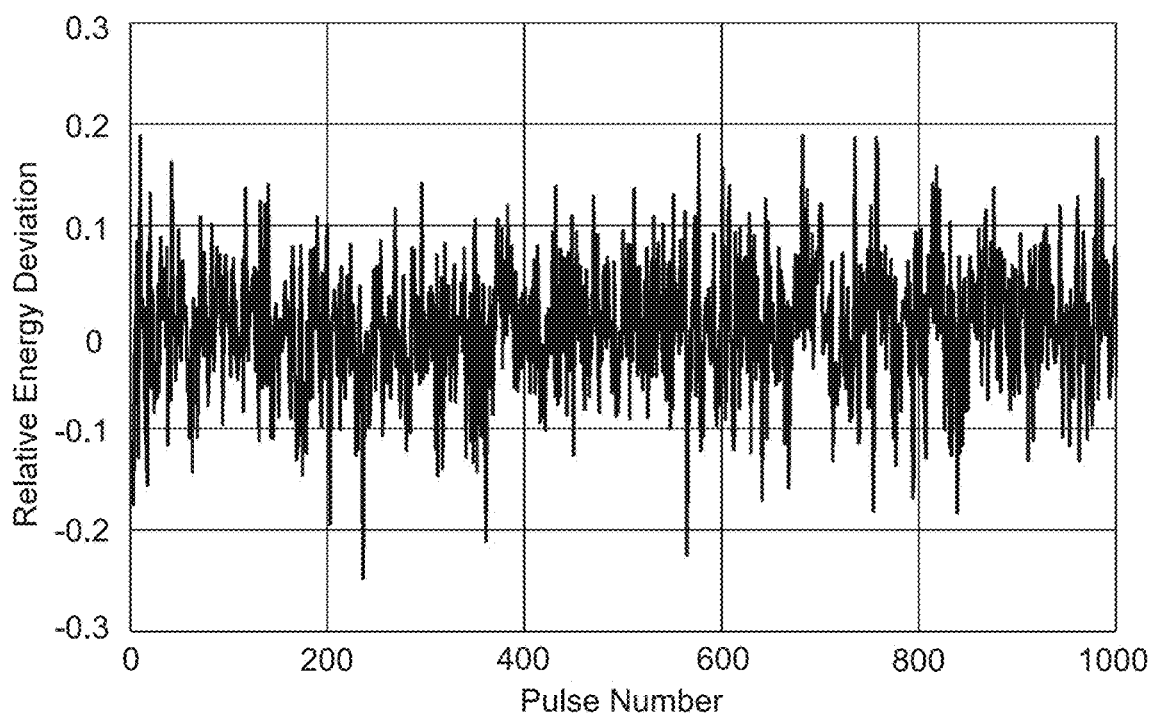
FIG. 4A is a graph schematically illustrating relative energy deviation vs. pulse number at the centroid of the pulsed laser beam from the prior-art excimer laser of FIG. 3A.
Figure 4B:
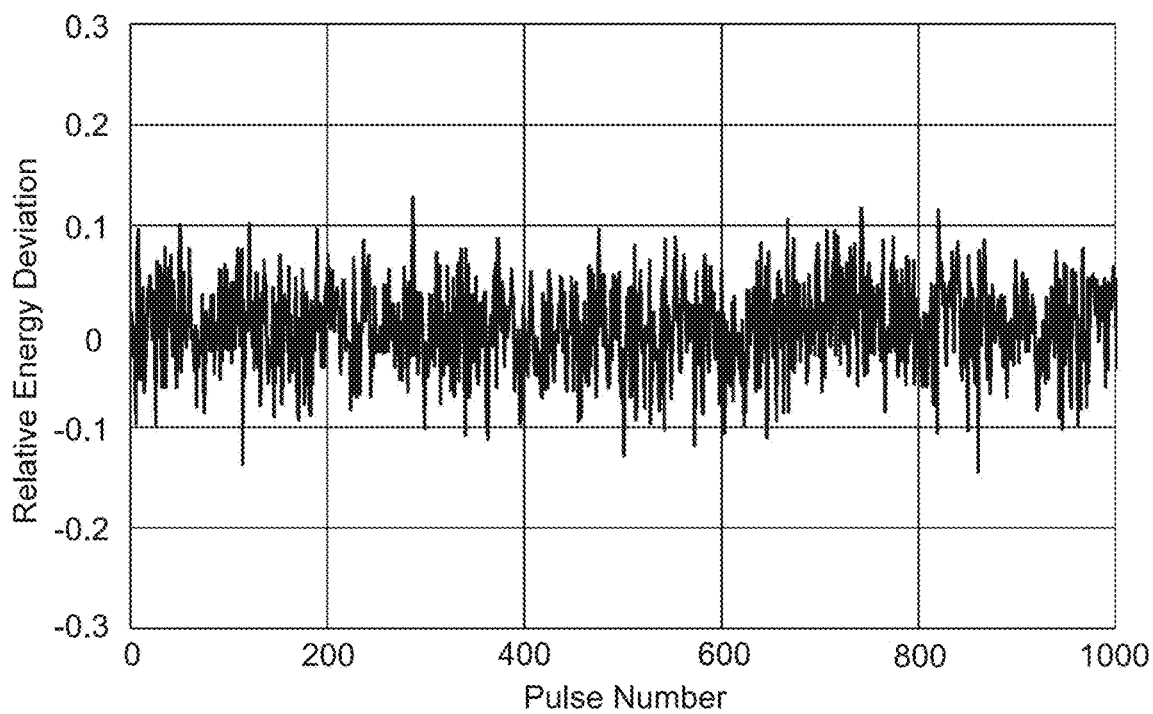
FIG. 4B is a graph schematically illustrating relative energy deviation vs. pulse number at the centroid of the composite pulsed laser beam from the excimer laser of FIG. 3B.

FIG. 4A is a graph schematically illustrating relative energy deviation vs. pulse number measured from 1000 camera images of the laser beam from the prior-art excimer laser of FIG. 3A. Each camera image captures one laser pulse. The energy deviation is that of the pixel closest to the centroid of each image. The standard deviation is 6.46%. FIG. 4B is a graph schematically illustrating relative energy deviation vs. pulse number measured from 1000 camera images of the composite output beam from the inventive excimer laser of FIG. 3B. The standard deviation is 4.42%. FIGS. 3B and 4B show that the output beam of the inventive excimer laser is significantly more uniform and more stable than the output beam of the equivalent prior-art excimer laser.

An advantage of the inventive excimer laser is that a weaker and therefore less-costly beam homogenizer can be used to achieve the same processing quality as a prior-art excimer laser. Another advantage is that time intervals between gas changes and window replacements can be extended, because instabilities and non-uniformities in the output beam take longer to reach maximum tolerance limits for a process. Extending average or scheduled time intervals between these maintenance procedures reduces laser downtime and cost of ownership.

Figure 1C:
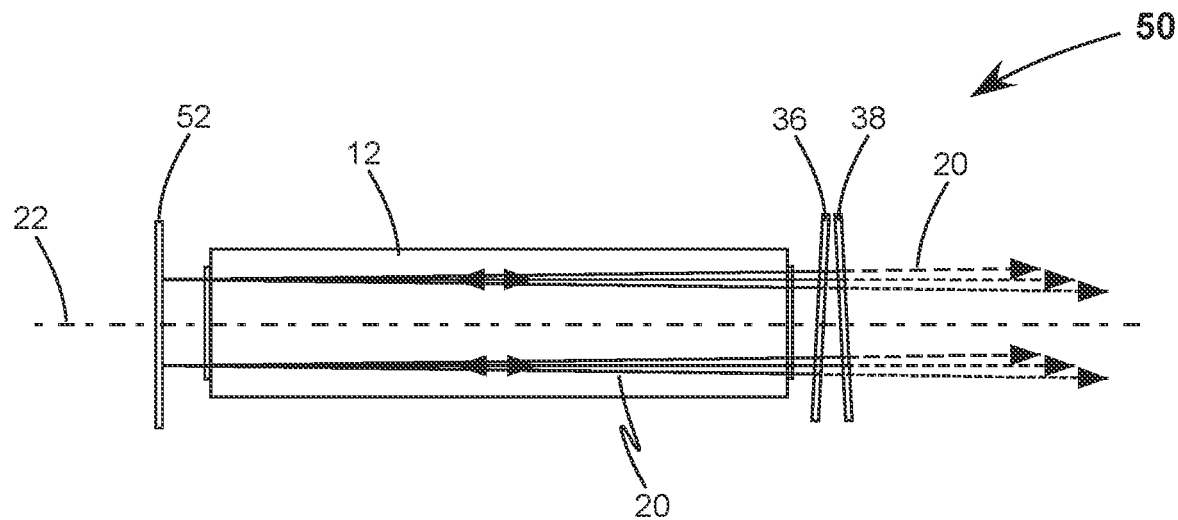
FIG. 1C is a side-view schematically illustrating another preferred embodiment of excimer laser in accordance with the present invention, similar to the excimer laser of FIG. 1B, but having just one rear mirror.
Figure 1D:
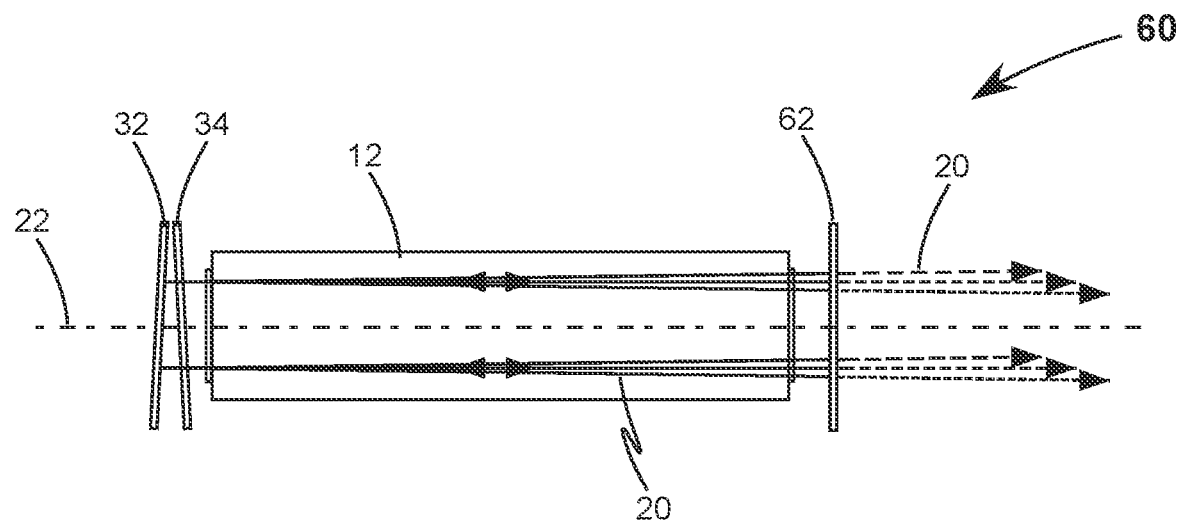
FIG. 1D is a side-view schematically illustrating yet another preferred embodiment of excimer laser in accordance with the present invention, similar to the excimer laser of FIG. 1B, but having just one output-coupling mirror.

Although one embodiment of the present invention is described above having two rear mirrors and two output-coupling mirrors, additional partially-reflective rear mirrors and/or additional output-coupling mirrors may be included to further mitigate fine structure, without departing from the spirit and scope of the present invention. In another embodiment of the present invention, illustrated schematically in FIG. 1C, an excimer laser 50 has one rear mirror 52 that is high-reflecting and a plurality of output-coupling mirrors 36 and 38. In yet another embodiment of the present invention, illustrated schematically in FIG. 1D, an excimer laser 60 has a high-reflecting rear mirror 32, at least one partially-reflective rear mirror 34, and one output-coupling mirror 62.

Although the resonator mirrors described above had planar surfaces, excimer laser mirror surfaces sometimes have slight curvature. As one of skill in the art would recognize, the principals of the present invention can be applied to resonator mirrors having slight curvature.

The present invention is described above in terms of a preferred embodiment and other embodiments. The invention is not limited, however, to the embodiments described and depicted herein. Rather, the invention is limited only by the claims appended hereto.

What is claimed is:

1. An excimer laser generating a laser beam, comprising:
   a laser chamber containing an energized gas mixture;
   a first rear mirror having a high reflectivity of about 100% at a wavelength of the laser beam;
   a second rear mirror that is partially reflective, the second rear mirror having a reflectivity in a range between 20% and 80% at the wavelength of the laser beam, the first and second rear mirrors located at one end of the laser chamber, the second rear mirror located between the first rear mirror and the laser chamber, the first and second rear mirrors tilted with respect to each other at a first angle;
   a first output-coupling mirror; and
   a second output-coupling mirror, the first and second output-coupling mirrors partially reflective, each of the first and second output-coupling mirrors having a reflectivity of less than 5% at the wavelength of the laser beam, the first and second output-coupling mirrors located at an opposite end of the laser chamber, the first and second output-coupling mirrors tilted with respect to each other at a second angle.

2. An excimer laser as recited in claim 1, wherein both the first and second rear mirrors are tilted with respect to an optical axis of the laser beam.

3. An excimer laser as recited in claim 1, wherein both the first and second output-coupling mirrors are tilted with respect to an optical axis of the laser beam.

4. An excimer laser as recited in claim 1, wherein the first angle is equal to the second angle.

5. An excimer laser as recited in claim 1, wherein the first and second rear mirrors are on opposite surfaces of a transparent wedged-shaped substrate.

6. An excimer laser as recited in claim 1, wherein the first and second output-coupling mirrors are on opposite surfaces of a transparent wedged-shaped substrate.

7. An excimer laser as recited in claim 1, wherein the first angle and the second angle are both greater than 0.05 milliradians.

8. An excimer laser as recited in claim 1, wherein the second rear mirror has a reflectivity in a range between 35% and 65% at the wavelength of the laser beam.

9. An excimer laser as recited in claim 1, wherein the first and second output-coupling mirrors have the same reflectivity at the wavelength of the laser beam.

10. An excimer laser as recited in claim 1, wherein the first angle is in a range between 5% and 20% of the full-angle divergence of a laser beam from an equivalent excimer laser having all resonator mirrors at normal incidence to the laser beam.

11. An excimer laser as recited in claim 1, wherein the second angle is in a range between 5% and 20% of the full-angle divergence of a laser beam from an equivalent excimer laser having all resonator mirrors at normal incidence to the laser beam.

12. An excimer laser generating a laser beam, comprising:
    a laser chamber containing an energized gas mixture;
    a rear mirror located at one end of the laser chamber having a high reflectivity of about 100% at a wavelength of the laser beam;
    a first output-coupling mirror; and
    a second output-coupling mirror, the first and second output-coupling mirrors partially reflective, each of the first and second output-coupling mirrors having a reflectivity of less than 5% at the wavelength of the laser beam, the first and second output-coupling mirrors located at an opposite end of the laser chamber, the first and second output-coupling mirrors tilted with respect to each other at a relative tilt angle, a normal of each of the first and second output-coupling mirrors tilted with respect to an optical axis of the laser beam by an angle between 0.05 and 0.2 milliradians, both the first and second output-coupling mirrors tilted with respect to the rear mirror.

13. An excimer laser as recited in claim 12, wherein the first and second output-coupling mirrors are on opposite surfaces of a transparent wedged-shaped substrate.

14. An excimer laser generating a laser beam, comprising:
    a laser chamber containing an energized gas mixture;
    a first rear mirror having a high reflectivity of about 100% at a wavelength of the laser beam;
    a second rear mirror that is partially reflective, the second rear mirror having a reflectivity in a range between 20% and 80% at the wavelength of the laser beam, the first and second rear mirrors located at one end of the laser chamber, the second rear mirror located between the first rear mirror and the laser chamber, the first and second rear mirrors tilted with respect to each other at a relative tilt angle, a normal of each of the first and second rear mirrors tilted with respect to an optical axis of the laser beam by an angle between 0.05 and 0.2 milliradians; and
    an output-coupling mirror that is partially reflective, the output-coupling mirror having a reflectivity in a range between 4% and 10% at the wavelength of the laser beam, the output-coupling mirror located at an opposite end of the laser chamber, the output-coupling mirror tilted with respect to both the first and second rear mirrors.

15. An excimer laser as recited in claim 14, wherein the first and second rear mirrors are on opposite surfaces of a transparent wedged-shaped substrate.

* * * * *